Dec. 4, 1951      C. C. BORDEN, SR      2,577,564
FLUID FLOW CONTROL SYSTEM
Filed July 27, 1946
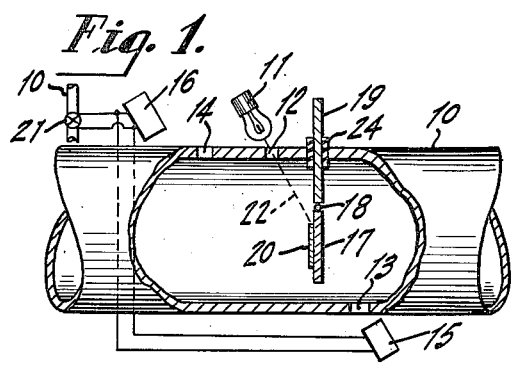
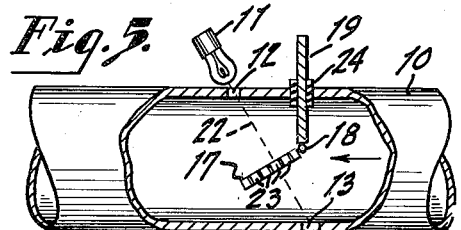
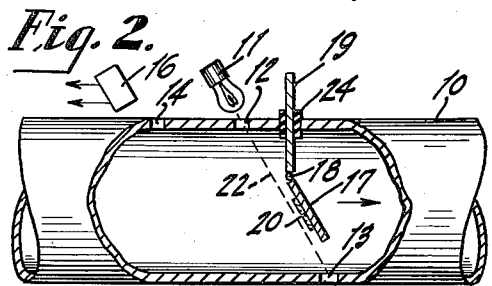
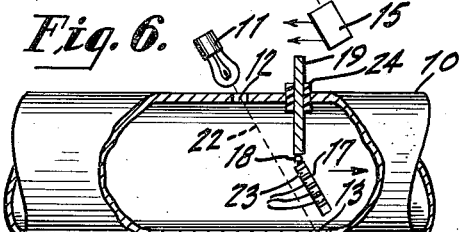
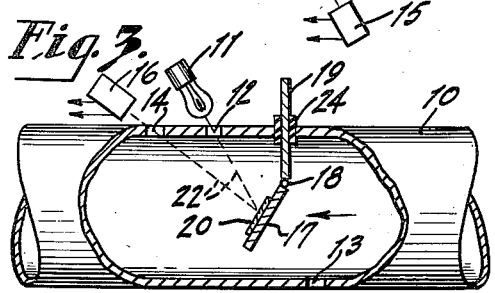
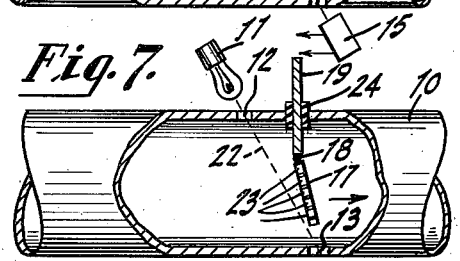
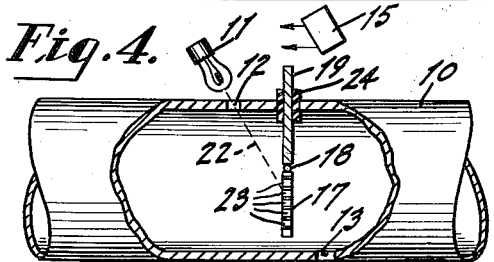
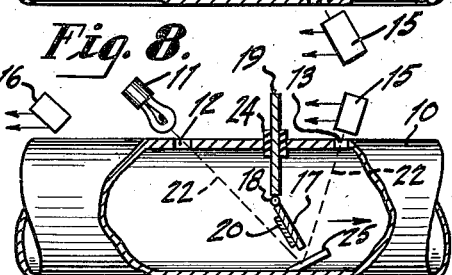
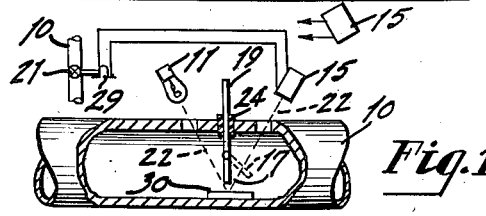
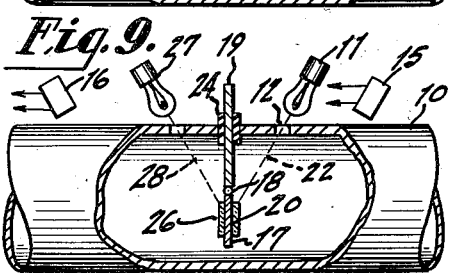
INVENTOR.
Clifford C. Borden, Sr.
BY William A. Galesak
ATTORNEY Patented Dec. 4, 1951

2,577,564

UNITED STATES PATENT OFFICE 2,577,564

FLUID FLOW CONTROL SYSTEM

Clifford C. Borden, Sr., New Providence, N. J., assignor to Radio Corporation of America, a corporation of Delaware Application July 27, 1946, Serial No. 686,798

6 Claims. (Cl. 137—152)

My invention relates to fluid flow control systems and more particularly to control systems of the type employing photoelectric relays for translating mechanical movements into actuating potentials for an electrically energized valve.

The principal object of my invention is the provision of control means for controlling the flow of fluid with reference to a datum point.

Another object of my invention is to provide a control means responsive to abnormal conditions of fluid flow and operative to correct such abnormal conditions.

A further object of my invention is to restrict the flow of fluid in a conduit to one direction with respect to a selected reference point on the conduit.

An additional object is to control the velocity of flow in said one direction to confine said velocity to a range between substantially zero flow and a predetermined maximum rate of flow.

A yet further object of the invention is to control the flow of fluid past a datum point in such a manner that flow in one direction operates actuating means to substantially instantaneously stop such flow, and flow in another direction exceeding a predetermined maximum rate operates actuating means which is gradual in operation in bringing such flow to a stop.

Another object is to provide a control system for fluid which includes mechanical means responsive in displacement to said reverse flow and said excessive rate of flow, a light sensitive relay arranged to be energized by a light source which is controlled by said displacement of said mechanical means, and a valve associated with the light sensitive relay which is arranged to stop the flow when said displacement is representative of either said reverse flow or said excessive rate of flow, and to permit said flow when the displacement referred to is indicative of a rate of flow in said one direction below said predetermined maximum rate of flow.

A further object of my invention is an automatically operable fluid flow control system which is manually adjustable to vary the predetermined maximum rate of flow permitted thereby.

An additional object is to provide a fluid flow control system that will assure safety of operations involving the flow of fluids.

According to my invention, I provide a system for the control of fluid flow past a datum point which includes a light source, a light sensitive relay disposed to receive light from said light source, mechanical means arranged to be displaced in response to fluid flow past said datum point into and out of registry with said light source and said light sensitive relay, to shield from or expose to said light source said relay, and a valve operable to sequentially permit and stop said fluid flow in response to actuation by said relay.

In one embodiment thereof my invention employs a horizontal section of a conduit arranged to confine a fluid flow. The wall of this section is provided with three transparent windows. A light source is positioned exteriorly of this section of conduit adjacent one of said windows and arranged to direct a light beam into the interior of the conduit section. Two light sensitive relays operatively connected to a valve associated with the conduit are positioned exteriorly of the conduit section, each adjacent one of said windows and arranged to be energized by said light beam. A movable element is mounted within the conduit section referred to and arranged to respond in displacements corresponding to conditions of flow within the conduit. The relative positions of the light source, the light sensitive relays and the movable element are such that when the condition of fluid flow within the conduit departs from predetermined standards, the movable element permits light to reach either of said relays which results in a stoppage of flow in the conduit. When the departure from normal flow is in the form of a reverse flow, the movable element assumes a position whereby a mirror applied thereto reflects the light from the light source to one of the light sensitive relays, and when the departure consists of an excessive rate of flow in a normal direction, the movable element is given a displacement in response thereto which moves it out of registry with said light source and relay, thus exciting the relay and closing the valve referred to. In this embodiment it is preferable that the fluid within the conduit be transparent to permit maximum reflective efficiency of the mirror on the movable element. The movable element is mounted for vertical adjustment so that its displacement may be made representative of any desired maximum rate of normal flow within the conduit.

Where two light sensitive relays are used, the valve referred to may be actuated by a solenoid and a motor. A solenoid acts abruptly and may be employed to stop the fluid flow when occurring in a direction other than normal. A motor control may be made to be gradual in action and may be used to control the flow in the normal direction so that the control of flow in the normal direction is gradual. This gradual control avoids a chattering manner of operation, resulting from abrupt stops. Furthermore, the solenoid may be provided with means for retaining it in closed position once it has assumed such position in response to a reverse flow. This would also avoid a chattering action resulting from a repetition of abrupt starts and stops, and in addition enables the condition causing such reverse flow to be investigated and eliminated. This arrangement, however, requires two light sensitive relays, the one to operate the solenoid and the other to operate the motor.

When the fluid to be controlled is under relatively high pressure, it is undesirable to subject the flow thereof in any direction to an abrupt stop. Under such condition a motor may be used to control both the direct and reverse flow of fluid. In this case a single relay may be employed since a single actuating means is utilized. The delay that the use of a motor control would produce in stopping the reverse fluid flow, due to its gradual action, can be tolerated if the valve continues in closed position after having been closed by a reverse fluid flow as explained above.

Another embodiment of my invention comprises an arrangement which requires only one light sensitive relay and conesquently only two windows in the conduit section referred to. In this embodiment, which is the preferred form of my invention, the movable element is provided with transverse slots, whereby it is capable of exposing the relay to the light source both under conditions of reverse flow from right to left within the conduit as well as excessive rate of flow in a normal direction from left to right. In this embodiment the fluid and the window in the conduit may be either transparent or translucent, since the operation does not depend upon the reflection of light. In this instance it is satisfactory if the fluid and window diffuse the light from the light source.

Further features and objects of my invention will become apparent as the description thereof proceeds. While the novel features of my invention are set forth with particularity in the appended claims, the invention will best be understood from the following description of specific embodiments thereof when read in connection with the accompanying drawing in which:

Figures 1, 2 and 3 show side elevations partly in section of a system incorporating my invention, wherein direct flow and reverse flow of a fluid within a conduit are controlled by separate photoelectric relays disposed on opposite sides of a conduit and actuating a common valve.

Figures 4, 5 and 6 show side elevations partly in section of a modification of the invention wherein one photoelectric relay in association with an eelctrically energizable valve is adapted to control both direct and reverse flow of fluid through the conduit.

Figure 7 is a side elevation partly in section showing the vane of Figures 4, 5 and 6 in a raised position and indicates the modification that this raised position produces in its action on the light beam.

Figure 8 is a side elevation partly in section of a further modification wherein separate photoelectric relays are mounted on the same side of the conduit for controlling the direct and reverse flow of fluid therein.

Figure 9 is a side elevation partly in section of a still further modification wherein entirely distinct means are provided for the direct flow and reverse flow controls.

Figure 10 is a side elevation, partly in section, of a still further modification in which the photoelectric relay actuates a motor to close the valve when shielded from the light source and to open the valve when exposed to the light source.

As shown in Figures 1, 2 and 3, I provide a conduit 10 for carrying a fluid therethrough from a source of supply to a point of delivery. My control system for controlling the flow of fluid through said conduit in the embodiment illustrated in these figures of the drawing comprises light source 11 producing light beam 22, windows 12, 13 and 14 in conduit 10, photoelectric relays 15 and 16 receiving light through appropriate ones of said windows 12, 13 and 14 in response to the angular position of vane 17, and valve 21 arranged to be actuated by the relays.

Vane 17 is pivotally mountd at 18 on support 19 and is adapted to be angularly displaced in response to the flow of fluid through conduit 10. The vane 17 pivots to the right when fluid flows from left to right, and pivots to the left when fluid flows from right to left. On one surface of the vane 17 is carried a mirror element 20. The vane 17 is adapted to intercept light beam 22 from light source 11 when the vane is in a vertical position as shown in Figure 1 in the absence of any fluid flow through conduit 10. However, when flow occurs from left to right, which I shall regard as the normal direction of flow, the vane 17 is angularly displaced to a position where it permits the light beam 22 to proceed from the light source 11 through windows 12 and 13 and to the photoelectric relay 15. Upon excitation by the light source 11, the photoelectric relay becomes operable to actuate valve 21 which serves to stop the fluid flow through conduit 10. The magnitude of the angular displacement of vane 17 to its beam clearance position is representative of the maximum rate of flow through conduit 10 in the normal direction which my control system permits.

The valve 21 is shown diagrammatically in Figures 1 and 10 and is omitted from the other figures of the drawing. The arrows emanating from the photoelectric cells shown in the other figures in the drawing indicate a connection of said photoelectric cell to the valve means 21. This valve means 21 may be of any conventional structure and is not believed to require further description.

In addition to stopping the flow of fluid through conduit 10 when an excessive rate of flow occurs therein, this embodiment of my control system is also operative to stop the flow of fluid when a reverse flow therein is initiated. The manner of this operation is shown in Figure 3 wherein a reverse flow of fluid in conduit 10 has served to angularly displace vane 17 to the left whereby the light beam from light source 11 entering window 12 is reflected by mirror 20 on vane 17 to photoelectric relay 16 through window 14. The action of photoelectric relay 16 is similar to that of relay 15 and serves to energize valve 21 to cause it to stop the flow of fluid through conduit 10.

Figures 4, 5, 6 and 7 show a modification of my invention wherein only one photoelectric relay 15 is required for accomplishing the aforementioned controls of the fluid flow. In this modification vane 17 is provided with transverse slots 23. When the vane 17 is in a vertical position shown in Figure 4, it effectively intercepts the light from light source 11. However, when it is either angularly displaced to the left or right as shown in Figures 5 and 6, it permits the light from light source 11 to strike photoelectric relay 15 which energizes valve 21 shown in Figure 1 to shut off the fluid flow. A plurality of slots are shown in vane 17, although only one slot is operative at any one time to permit light to reach the photoelectric relay 15. However, when the vane 17 is vertically raised or lowered, as will be explained later herein, it will cause different slots to serve as the light transfer means. Consequently it is necessary to provide a plurality of transverse slots in vane 17.

The adjustable feature of my invention will now be described.

Support 19 is mounted on conduit 10 through a bushing 24 which permits the support 19 to be raised or lowered into conduit 10. Figure 6 shows the support 19 and vane 17 in a relatively low vertical position. In this case it will be noted that the deflection of vane 17 required for it to clear the light beam 22 from light source 11 to relay 15 is substantial, whereas in the raised position of vane 17, shown in Figure 7, a relatively slight angular deflection of the vane serves to unblock the path for the light beam. Therefore, if it is desired to increase the maximum rate of flow that the control system will permit through conduit 10, it is necessary to lower the support member 10 through bushing 24 in conduit 10. On the other hand, when it is desired to decrease the maximum rate of flow that my control system will permit, all that is required is to raise the support member 19 with respect to bushing 24.

I thus provide an effective control system which operates to stop reverse flow of fluid through a conduit and which adjustably controls the normal flow of fluid through a conduit so that its velocity is confined within certain limits, the lower limit being substantially zero flow and the maximum limit being that velocity of flow which is determined by the vertical position of the support member 19.

Figure 8 is a further modification wherein the light beam 21 from light source 11 is adapted to strike mirror 25 when unintercepted by vane 17, and to be reflected to photoelectric relay 15 which then actuates valve 21 to shut off the fluid flow. Mirror 20 cooperates with light beam 22 and photoelectric relay 16 to prevent reverse flow, which action is illustrated in Figure 3.

Figure 9 shows an entirely independent set of controls disposed on each side of vane 17. To the left of vane 17 there is positioned a set of controls comprising a mirror 26, a light source 27 forming a beam 28 and a photoelectric relay 16 adapted to actuate fluid control valve 21. This system operates to control the reverse flow of fluid. To the right of vane 17 is positioned a mirror 20, light source 11 forming beam 22, which is adapted to actuate photoelectric relay 15, which in turn energizes valve 21 under the influence of an excessive velocity of direct flow of fluid within conduit 10. This modification places all the elements of the control system on one side of the conduit.

Figure 10 shows a further modification of my invention wherein one photoelectric relay 15 is responsive to light from light source 11 to open valve 21 by actuating motor 29. Mirror 30 is provided and disposed at a suitable angle with respect to light source 11 and relay 15 to direct light from said light source to the relay. When vane 17 is displaced by the magnitude of fluid flow to a position indicated by dotted lines, it prevents light from reaching relay 15. Such blocking of the light, however, is characterized by gradients no matter how rapidly the movement of vane 17 takes place and relay 15 is so constituted that it supplies a potential to motor 29 which is characterized by a similar gradient. Therefore, when the vane 17 starts to block the light source a relatively small potential is fed to the motor 29 which causes it to turn at a relatively slow rate. As the blocking action of the vane continues a point is reached when all light of the light source 11 is blocked, at which time a maximum potential is impressed on the motor to cause it to reach its maximum rate of actuation to completely close valve 21. A similar action takes place on occurrence of reverse fluid flow and the stoppage of such flow is, therefore, accomplished gradually. This gradual action avoids a chattering manner of operation resulting from abrupt stops and starts in the fluid flow.

The structures illustrated in the various figures of the drawing accompanying this description are shown in a form designed to accentuate the features of my invention. Thus in Figures 2, 6 and 8, the angular displacement of vane 17 is greater than that required to clear the beam 22. Furthermore, in Figures 3 and 5 the angular position of vane 17 is more pronounced than would be tolerated in actual practice of my invention. However, to increase the sensitivity of a device incorporating my invention is clearly within the bounds of skill in the art.

While I have described several embodiments of my invention, it is distinctly to be understood that my invention is not to be limited thereto. Thus I desire to include within the scope of the appended claims such modifications as will be apparent to persons skilled in the pertinent art.

What I claim is:

1. A system for preventing the flow of fluid in a conduit in one direction and for controlling said flow within predetermined limits of velocity in the other direction comprising a conduit for said fluid, a valve arranged to block and unblock said flow, a light source, a light sensitive relay in light communication therewith, adjustable means for interrupting said light communication during flow of said fluid in the other direction between velocity values of substantially zero and a desirable maximum velocity, said means being operable to effect said light communication between said light source and said light responsive relay under conditions of flow in the one direction and conditions of flow in the other direction above said desirable maximum velocity, said light sensitive relay being operable to actuate said valve to a blocking position in response to light from said light source.

2. A flow control system for translucent fluid comprising in combination a conduit for said fluid, a valve associated with said conduit, means for closing said valve in response to any fluid flow in one direction, and means for closing said valve in response to a velocity of such flow above a predetermined desirable value in the opposite direction, said means including a common light source, a light sensitive relay, and an opaque vane mounted for angular displacement axially with respect to said conduit in response to fluid flow therein, said vane being so positioned with respect to the light source and the light sensitive relay as to break the light communication therebetween during fluid flow below said predetermined velocity in said opposite direction and to effect such light communication in response to any flow in said one direction and a flow in said opposite direction above a predetermined desirable velocity whereby an effective control of the fluid flow through the conduit is provided.

3. A flow control system for translucent fluid comprising in combination a conduit for said fluid, a valve associated with said conduit, means for closing said valve in response to any fluid flow in one direction and means for closing said valve in response to a velocity of such flow above a predetermined desirable value in the opposite direction, said means including a common light source and light sensitive relay, windows in said conduit affording light communication between said light source and said light sensitive relay, an opaque vane mounted within said conduit for angular displacement axially with respect to said conduit in response to fluid flow therein, said vane being so positioned with respect to the light source and light sensitive relay as to break the light communication therebetween during fluid flow below said predetermined velocity in said opposite direction and to effect such light communication in response to any flow in said one direction and a flow in said opposite direction above a predetermined desirable velocity, whereby an effective control of the fluid flow through the conduit is provided.

4. A flow control system for fluid comprising a conduit, a valve across said conduit arranged to be opened and closed for permitting and stopping the flow of fluid in said conduit, a photoelectric relay arranged to actuate said valve to one of said opened and closed positions, a light source for energizing said relays, a shield movable in response to said flow for performing one of the functions of shielding said relay from, and exposing it to, said light when the rate deviates from a predetermined range in one direction, whereby said valve is actuated in response to a predetermined rate and direction of flow to closed position, and a support for said shield, said support being adjustable for changing the path of movement of said shield for causing said shield to selectively block and unblock light from said light source to said relay in response to any one of different predetermined rates of flow.

5. A flow control system for fluid comprising a conduit for confining a fluid flow, and means for stopping said flow, said means including a valve across said conduit urged to open position, at least one photoelectric relay connected to said valve, a light source for energizing said relay to close said valve, a movable shield responding in movements related in magnitude and direction to different rates and directions of flow of said fluid in said conduit, and adjustable means engaging said shield for causing said movements thereof to be differently related to said different rates of flow, said shield being opaque and disposed for movement between and into and out of registry with said light source and said relay, whereby said shield is adapted to expose said light source to said relay in response to rates of flow other than a selected predetermined range in one direction in said conduit for energizing said relay and closing said valve.

6. In a flow control system including a conduit for confining a fluid, a light source, a valve across said conduit urged to one of open and closed positions, and a photoelectric relay in the light path of and controlled by said light source for actuating said valve to the other of said open and closed positions, the improvement comprising an opaque shield depending vertically into said conduit and supported for free swinging movements in a predetermined path through an arc of substantially 180° in response to predetermined rates and direction of fluid flow in said conduit, a portion of said predetermined path crossing said light path, said shield being positioned in said portion of said predetermined path by rates of flow in response to one of predetermined desirable and undesirable ranges of velocities in one direction, whereby said valve is adapted to be actuated to closed position in response to undesirable flow conditions and to open position when the flow conditions are of desirable characteristics.

CLIFFORD C. BORDEN, Sr.

REFERENCES CITED

The following references are of record in the file of this patent:

UNITED STATES PATENTS

| Number | Name | Date |
|---|---|---|
| 1,924,139 | Thomas | Aug. 29, 1933 |
| 1,999,496 | Adams | Apr. 30, 1935 |
| 2,236,249 | Newton | Mar. 25, 1941 |
| 2,275,833 | Adams | Mar. 10, 1942 |
| 2,317,807 | Ryder | Apr. 27, 1943 |
| 2,325,884 | Shorn | Aug. 3, 1943 |
| 2,386,275 | Sigmund | Oct. 9, 1945 |